United States Patent [19]
Poole

[11] Patent Number: 6,152,475
[45] Date of Patent: Nov. 28, 2000

[54] TRUCK TRAILER STEERING APPARATUS

[76] Inventor: James E. Poole, P.O. Box 12, Newcastle, Me. 04553

[21] Appl. No.: 09/337,318

[22] Filed: Jun. 22, 1999

[51] Int. Cl.$^7$ .................................................. B62D 53/06
[52] U.S. Cl. ........................................... 280/426; 280/442
[58] Field of Search .................................... 280/426, 442, 280/86, 82

[56] References Cited

U.S. PATENT DOCUMENTS

| 4,451,058 | 5/1984 | Curry | 280/423 |
|---|---|---|---|
| 4,949,987 | 8/1990 | Gallatin | 280/459 |
| 5,035,439 | 7/1991 | Petrillo | 280/81.6 |
| 5,232,238 | 8/1993 | Ducote | 280/426 |
| 5,244,226 | 9/1993 | Bergh | 280/442 |
| 5,338,050 | 8/1994 | Haire | 280/476.1 |

Primary Examiner—Kevin Hurley
Assistant Examiner—Kevin McKinley
Attorney, Agent, or Firm—Arthur J. O'Dea

[57] ABSTRACT

A converter dolly replaces the rear wheels of a truck trailer to provide the trailer with a steering ability about its rear wheels. The converter dolly is modified to include a hydraulic actuating system, including a piston, cylinder, and pump assembly, which act upon the tongue of the converter dolly to pivot the converter dolly about a king pin. The actuation of the hydraulic system is performed by the driver of the tractor towing the trailer through a control system mounted in the tractor cab.

9 Claims, 4 Drawing Sheets

TRUCK TRAILER STEERING APPARATUS

BACKGROUND OF THE INVENTION

This invention relates to an improved truck trailer design which incorporates the use of standard components, slightly modified, to enable enhanced maneuverability through the use of a steerable rear axle assembly. The intention modifies the design of large truck trailers to include a rear axle which may be pivotally controlled by the driver of the towing truck.

The invention addresses the need to enhance the maneuverability of large tractor trailers on highways and city streets. Increased trailer lengths may be used in areas where previously they could not be towed for lack of sufficient area to maneuver.

When a tractor towing a conventional trailer of 48 feet or more in length negotiates a sharp turn in the road, it is necessary that the tractor first swing out in a direction opposed to the desired turn. This motion ensures that when the tractor makes the turn, the trailing edge of the trailer will clear the intersection. If there is insufficient space to make this preparative maneuver, it is possible that the tractor and trailer combination may not successfully negotiate the turn. In constrictive city streets, with significant traffic, a truck and its trailer may very well disrupt the flow of traffic while attempting to turn onto a side street.

In order to back a trailer into a loading or unloading dock, significant clear space must be afforded to allow the driver of the tractor the ability to orient the rear of the trailer in the desired direction. The only steering ability enabled in a conventional tractor trailer combination is through the relative orientation of the tractor to the trailer. The addition of rear wheel steering on the trailer significantly decreases the space required to maneuver the tractor-trailer combination.

The present embodiment of the invention combines elements of several commonly available tractor trailer elements in order to achieve a cost-effective means of implementation of the invention. It is necessary to briefly discuss these elements to understand the benefits associated with the invention.

A tractor is a truck which tows a semi-trailer; the tractor having a feature, commonly referred to as a fifth wheel, which facilitates its engagement to a receptacle on the semi-trailer.

Typically, a tractor pulling one trailer will be pivotally attached to the trailer. The rear wheel assembly of the trailer is rigidly attached to the bottom of the trailer body. If an additional trailer is towed in a double configuration, so that the tractor pulls two trailers, a second trailer is attached to the rear of the first trailer. A converter dolly is used to support the front end of the second trailer, which is pivotally attached to both the first trailer and the second trailer.

The invention uses the commonly available converter dolly mounted at the rear and bottom side of a common trailer body to facilitate a steerable rear wheel assembly. Further features of the invention will be apparent from the attached drawings and description of an illustrative embodiment of the invention.

BRIEF SUMMARY OF THE INVENTION

In summary, and in accordance with the above discussion, the foregoing objectives are achieved in the following embodiments.

1. A truck trailer steering apparatus comprising a trailer body wherein said trailer body has a bottom side, a first leading end, and a second trailing end,
  a coupler plate fixedly attached to said bottom side of said trailer body at said trailing end,
  a king pin fixedly attached to said coupler plate, extending downwardly and perpendicularly from said bottom side of said trailer body,
  a converter dolly used for towing a double trailer engaged in said king pin,
  said converter dolly having a tongue with a pivot pin,
  at least one hydraulic actuator having two ends, a first end hingedly attached to said pivot pin extending essentially perpendicularly from said tongue, and a second end hingedly attached to said bottom side of said trailer body,
  a hydraulic pump and motor to drive said hydraulic actuator, and
  a control mounted in the cab of the tractor towing said trailer body whereby when the driver operates said control, said hydraulic actuator extends or retracts, causing said converter dolly to rotate about said king pin to steer said trailer body.

2. The truck trailer steering apparatus of paragraph 1 wherein said converter dolly used for towing a double trailer is a tandem configuration having two axles.

3. The truck trailer steering apparatus of paragraph 1 wherein said converter dolly used for towing a double trailer is a single configuration having one axle.

4. The truck trailer steering apparatus of paragraph 1, wherein said hydraulic pump and motor is a self-contained unit, and
  said control is an electronic device connected to said self-contained hydraulic pump and motor unit.

5. The truck trailer steering apparatus of paragraph 1, further comprising a proximity detection sensor mounted on said bottom side of said trailer body, a sensor sending unit mounted on said converter dolly in close proximity to said positional sensor, and
  a graphic indicator mounted in said cab of the towing tractor,
  whereby said graphic indicator displays the reading of said positional sensor relative to the location of said sensor sending unit whereby the driver of said tractor towing said trailer body may visually determine the rotational position of said converter dolly relative to said trailer body.

6. The truck trailer steering apparatus of paragraph 1 further comprising a locking pin removably engaged in said converter dolly, and fixedly attached to said bottom side of said trailer body whereby said converter dolly may be prevented from rotating about said king pin as a safety precaution when travelling at highway speeds.

7. A truck trailer steering apparatus comprising a trailer body wherein said trailer body has a bottom side, a first leading end, and a second trailing end,
  a subframe slidably attached to said bottom side of said trailer body at said trailing end,
  a coupler plate fixedly attached to said subframe,
  a king pin fixedly attached to said coupler plate, extending downwardly and perpendicularly from said bottom side of said trailer body,
  a converter dolly used for towing a double trailer engaged in said king pin,
  said converter dolly having a tongue with a pivot pin,
  at least one hydraulic actuator having two ends, a first end hingedly attached to said pivot pin extending essentially perpendicularly from said tongue, and a second end hingedly attached to said subframe, a hydraulic pump and motor to drive said hydraulic actuator, and a control located in the cab of the tractor towing said trailer body whereby when the driver operates said control, said hydraulic actuator extends or retracts, causing said converter dolly to rotate about said king pin to steer said trailer body.

8. The truck trailer steering apparatus of paragraph 7 wherein said converter dolly used for towing a double trailer is a tandem configuration having two axles.

9. The truck trailer steering apparatus of paragraph 7 wherein said converter dolly used for towing a double trailer is a single configuration having one axle.

DETAILED DESCRIPTION OF THE INVENTION

Referring particularly to FIGS. 1 through 4 thereof, there is shown a new and improved trailer steering apparatus.

Figure 1:
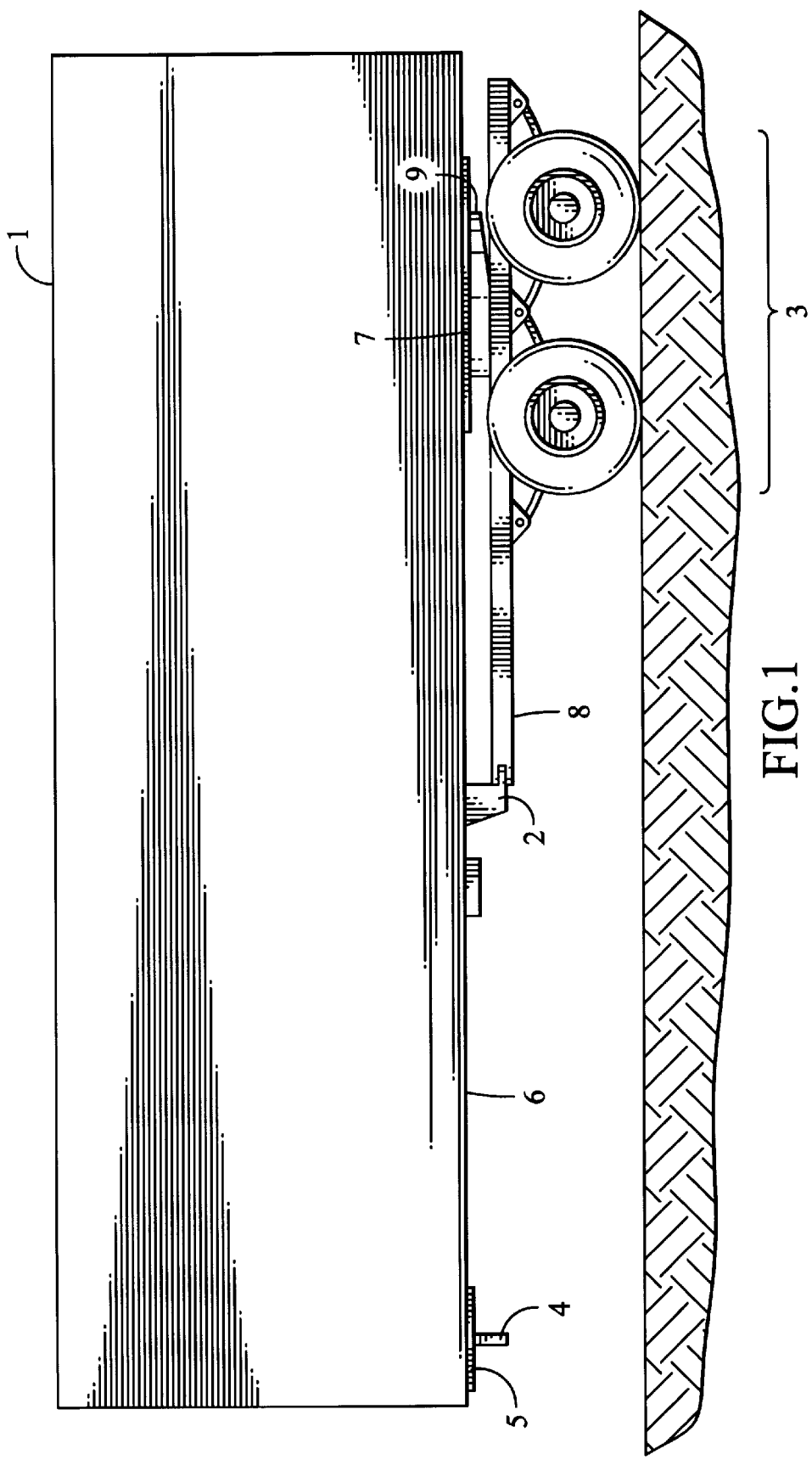
FIG. 1 is a side elevational view of an improved trailer steering apparatus embodying the invention.

FIG. 1 is a side elevational view of a trailer with an improved steering apparatus attached. The drawings show a trailer body 1, having a bottom 6, with a front king pin 4, rigidly attached to a coupler plate 5 at the leading end of the trailer body. The front king pin 4 engages in a tractor receptacle to facilitate the towing of the trailer. Rather than the conventional use of a rigidly attached rear wheel assembly, a converter dolly 9, is rotatably mounted to the bottom of the rear end of the trailer body 7. The converter dolly tongue 8, is hingedly connected to one or more hydraulic cylinders 2, so that when the hydraulic cylinders 2 actuate, the converter dolly tongue 8 pivots the rear wheel assembly 3.

Figure 2:
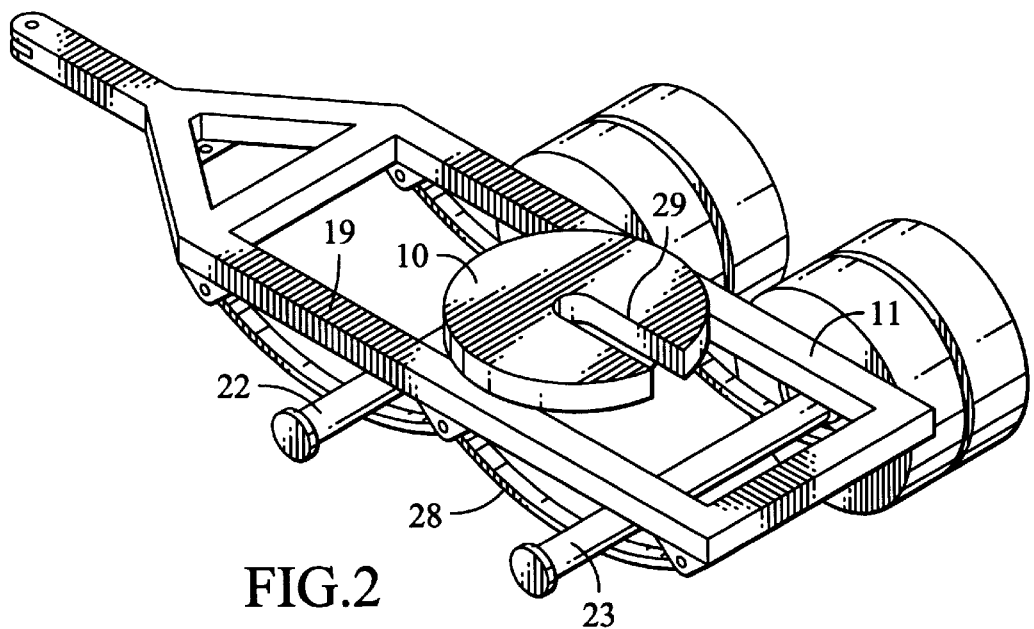
FIG. 2 is a fragmented perspective view of a tandem axle dolly used by the invention.

FIG. 2 is a fragmented perspective view of the converter dolly used by the invention. The converter dolly depicted in the drawing is a tandem dolly in that it has two axles 22, and 23. A single-axle converter dolly may be employed as a second embodiment. The axles are supported by a suspension 28, which is connected to a frame having a first side 11, and a second side 19. A dolly fifth wheel 10 is rigidly attached to frame side members 11 and 19.

The dolly fifth wheel 10 has a receptacle slot 29 extending partially into the fifth wheel such that when used in its conventional manner, the receptacle slot 29 engages into the front king pin 4 using a conventional locking arrangement. The converter dolly rotates about the front coupler plate 5 when towed as a second trailer in a double configuration.

Figure 3:
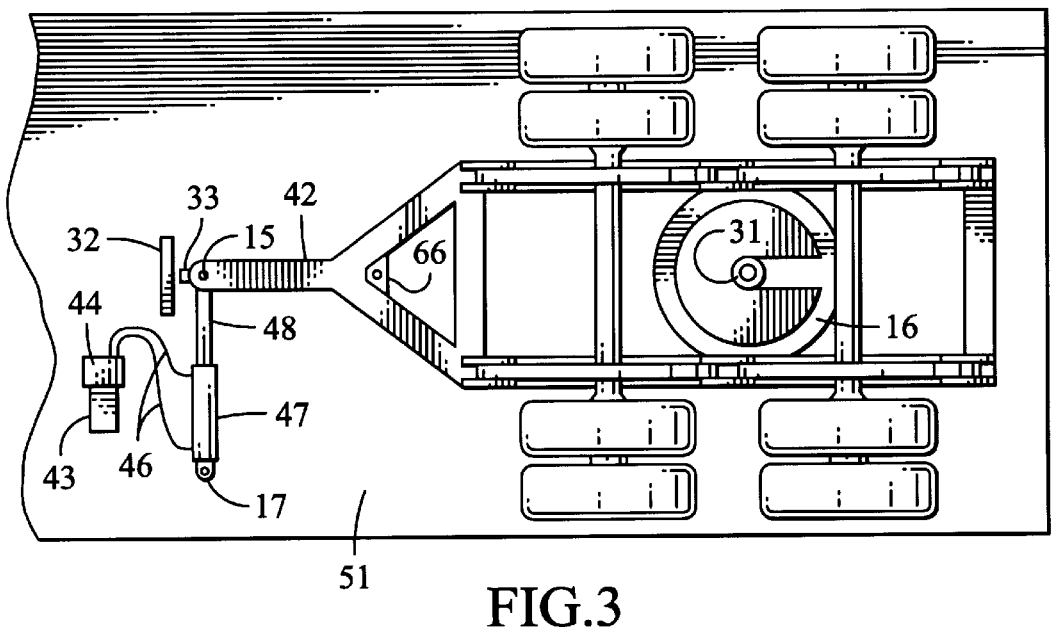
FIG. 3 is a bottom view of the FIG. 1 steering apparatus.

FIG. 3 is a bottom view of the steering apparatus. In this embodiment of the invention, the converter dolly is mounted at the rear of the trailer body. A coupler plate 16 is fixedly secured to the bottom of the trailer body floor 51, by welding, or other equivalent means of permanent attachment. A king pin 31 is fixedly mounted in coupler plate 16, extending perpendicularly and downwardly from the coupler plate. In this arrangement, the rear wheel assembly 3 (from FIG. 1) comprising a converter dolly may pivot about king pin 31. The fifth wheel 10 of the converter dolly is engaged in king pin 31 through receptacle slot 29 using a conventional locking arrangement, so that the trailer body may be steered when pulled forward or backed up in reverse by a tractor.

The rotation of the converter dolly about the rear king pin 31 is controlled through the addition of a hydraulic actuating system consisting of a pump 44, a motor 43, and at least one hydraulic actuator. A hydraulic actuator consists of a cylinder 47, a piston 48, and hydraulic hoses 46 which facilitate the flow of hydraulic fluid to, and from the pump 44 in, and out of the cylinder 47 causing the piston 48 to move inwardly or outwardly of the cylinder 47. Given the availability of pneumatic air pressure as an energy source on semi-trailers, an air over hydraulic system may be employed as an alternate embodiment of pump 44 and motor 43.

Figure 5:
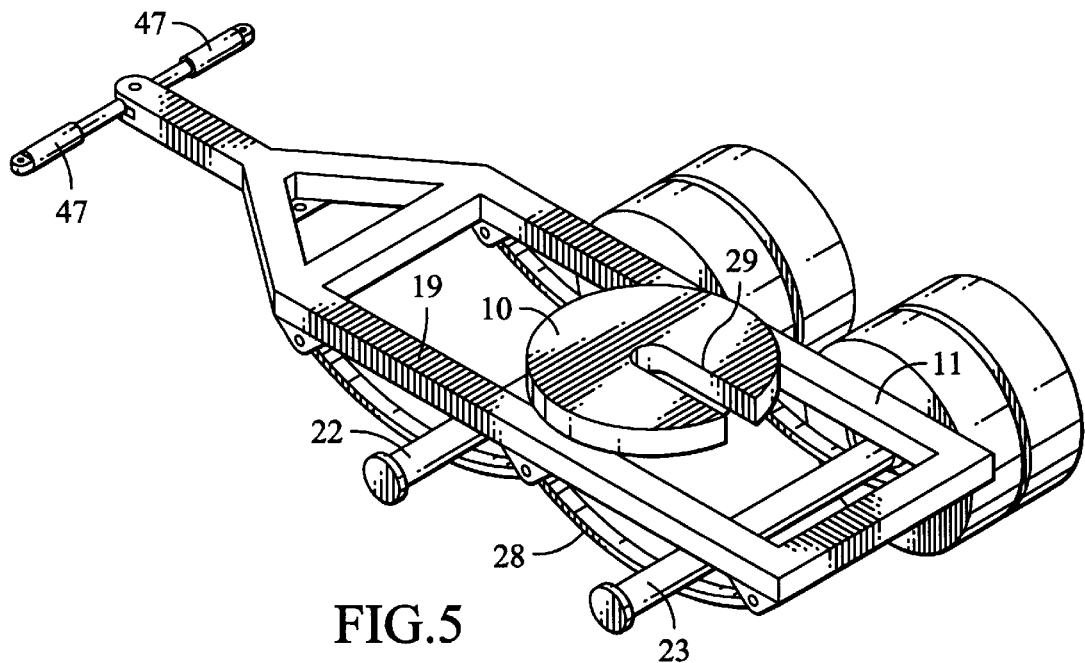
FIG. 5 is a fragmented perspective view of a tandem axle dolly used by the invention showing two hydraulic actuators attached to a pivot point on the dolly tongue.
Figure 6:
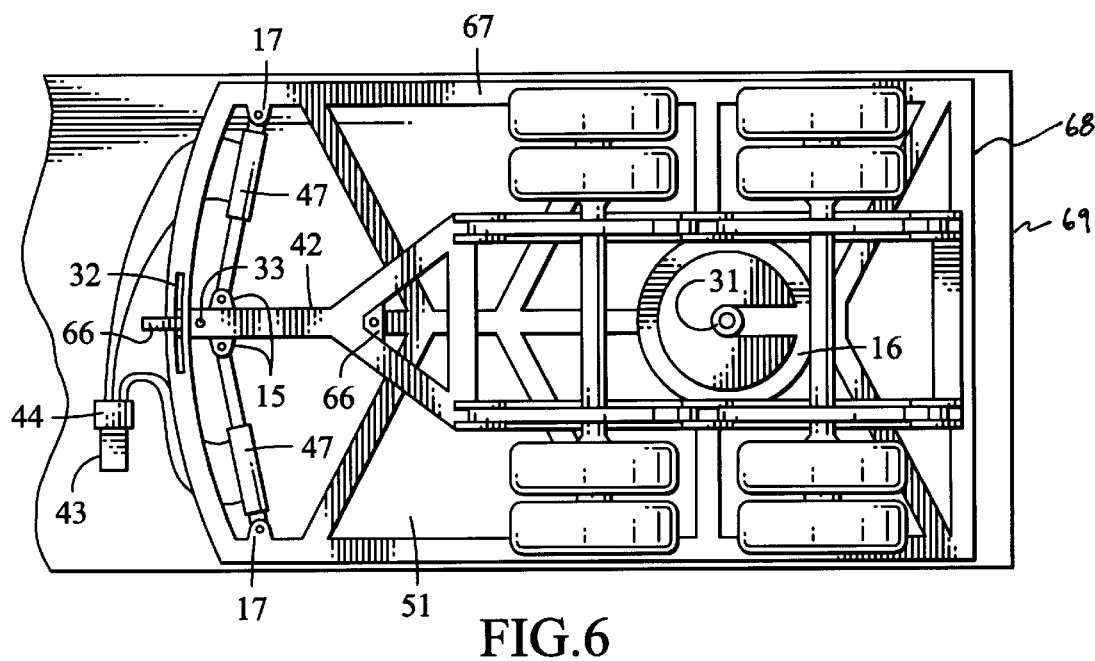
FIG. 6 is a bottom view of the FIG. 1 steering apparatus where two hydraulic actuators are used, and the steering apparatus is mounted on a subframe.

FIGS. 5 and 6 show an alternate configuration in that two hydraulic actuators may be used; each acting in cooperation with the other. The advantage of this alternate configuration is that each cylinder 47 and piston 48 need only operate in the outwardly extending direction, while simultaneously retracting the opposing cylinder 47 and piston 48 unit.

The tongue of the converter dolly 42 is modified at the tip to include a pivot pin 15. The modification may be implemented by mounting pivot pin 15 on the side of tongue of the converter dolly, as represented in FIG. 6. One end of piston 48 of each hydraulic actuator is hingedly attached to the pivot pin 15, so that the hydraulic actuator extends essentially perpendicularly from the converter dolly tongue 42. The opposing end of each hydraulic actuator, at pivot point 17 on cylinder 47, is hingedly attached to the bottom of trailer body 51. As piston 48 extends outwardly from, or retracts inwardly into, cylinder 47, the converter dolly rotates about king pin 31.

Figure 4:
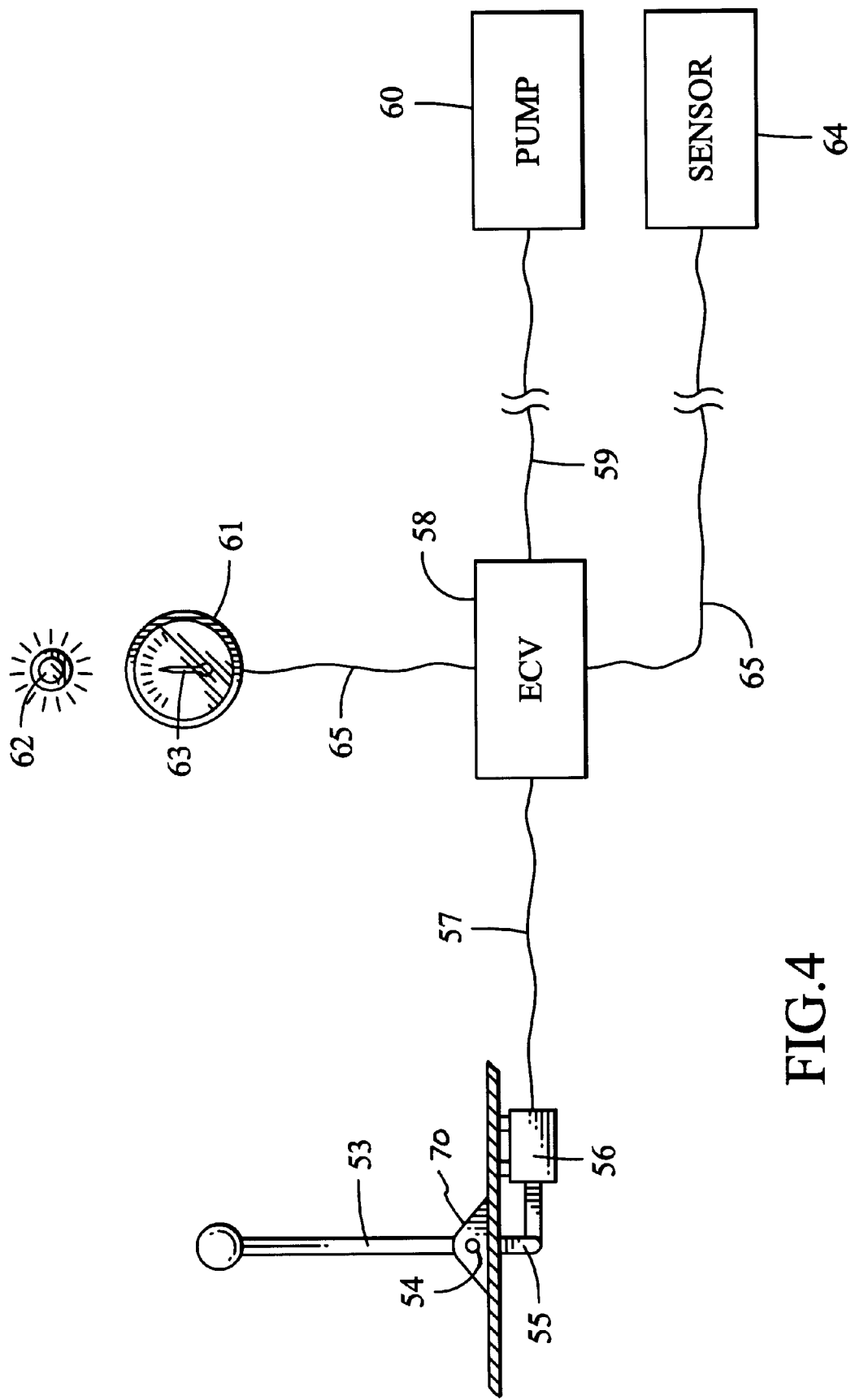
FIG. 4 is a schematic view of the controls used in the cab of the truck towing the trailer with the invention.

The rotation of the converter dolly about king pin 31 is controlled by the driver of the tractor towing the trailer. The driver actuates the hydraulic system which causes the trailer steering apparatus to rotate through a control mounted in the cab of the tractor. FIG. 4 schematically depicts the structure used to allow the driver of the tractor trailer to control the position of the trailer steering apparatus relative to the trailer body.

A lever 53 is mounted in the cab within comfortable reach of the driver of the tractor. Lever 53 is pivotally attached to frame 70 by a pin 54. Switch 56 is pivotally attached to the lever 53 through pin 55. An electronic control unit 58 creates a signal sent to switch 56 through cable 57; and monitors the returning signal. Movement of lever 53 results in the actuation of switch 56, which alters the signal sent by electronic control unit 58. A second signal is generated by electronic control unit 58 in proportion to the signal derived from switch 56. This second signal is sent to a self-contained hydraulic pump and motor unit 60 through cable 59. The second signal directs hydraulic pump and motor unit 60 to pump hydraulic fluid into, or out from the hydraulic actuator cylinder 47, resulting in a rotation of the converter dolly about king pin 31.

A second embodiment of the control unit described above and in FIG. 4 is the use of a device similar to the hydraulic control system added to large trucks which have snow plow rigs installed.

A third embodiment of the control unit described above and in FIG. 4 is to mount the entire control unit and its ancillary equipment in a portable unit that may be easily transferred from tractor to tractor.

FIG. 4 also depicts a graphic display indicator 61 which may receive a third signal from electronic control unit 58 through cable 65 which depicts the relative orientation of the wheels of the trailer steering apparatus to the trailer body. A straight ahead orientation of the wheels of the trailer may be indicated by the position of the arrow 63 in graphic display indicator 61 at the vertical position. Movement of lever 53 resulting in a rotation of the trailer steering apparatus may be reflected in graphic display indicator 61 through a rotation of arrow 63 proportional to the amount of rotation of the trailer steering apparatus.

The position of lever 53 may also provide visual feedback to the driver of the tractor as to the relative orientation of the wheels of the trailer steering apparatus to the trailer body. A straight ahead orientation of the wheels of the trailer may be indicated by the position of lever 53 in the vertical position. A detent, or default centering feature may be employed to allow the driver of the tractor to re-center the rear wheels effortlessly.

Since the position of the trailer wheels may present unanticipated handling concerns when travelling at highway speeds, the preferred embodiment of the invention includes a safety warning indicator 62 which illuminates when the wheels of the trailer steering apparatus are not in a straight ahead position. Electronic control unit 58 may employ the use of a sensor 64 to determine the position of the trailer steering apparatus. Sensor 64, mounted on the bottom of trailer body 51, may comprise a proximity detection sensor 32 which signals the position of a sensor sending unit 33 mounted on the converter dolly tongue 42, through cable 65, to electronic control unit 58. Sensor sending unit 33 may comprise a magnetic field emitting device which alters a signal sent to the proximity detection sensor 32 when moved in relative close proximity and in relation to the detection sensor 32.

Additionally, a locking mechanism consisting of a pin arrangement 66 may be used to mechanically lock converter dolly tongue 42 of the trailer steering apparatus in the straight ahead position. Disengagement of pin arrangement 66 from the converter dolly tongue 42 and the bottom of trailer body 51 would allow for the rotation of the converter dolly about king pin 31.

A sliding tandem arrangement of attaching rear wheels to a trailer is common in trailers of 48 feet or more in length. In this arrangement, the rear wheels of the trailer are slidably attached to a steel channel subframe of the trailer body using plastic pads and spring-loaded locking pins. The position of the rear wheels may then be adjusted through releasing the locking pins from the steel channel subframe, and changing the relative position of the rear wheel assembly to the trailer body along its length. The advantages of this design is that it allows the driver of the tractor and trailer to balance the weight distribution. Some states impose restrictions on wheel spacing and weight distribution when travelling on specific roads and bridges.

An alternative embodiment of the invention is the attachment of the invention in a manner similar to a sliding tandem arrangement. In this embodiment, as shown in FIG. 6, subframe 67 is slidably mounted to the bottom side of trailer body 6. The position of subframe 67 may be linearly adjusted so that the trailing edge 68 of subframe 67 is positioned from flush, to eight (8) feet from the trailing edge of trailer body 69.

Coupler plate 16 is rigidly attached to subframe 67 and pivot point 17 is located on subframe 67. Converter dolly 42 may then be rotated about king pin 31, regardless of the relative position of subframe 67 to the trailer body 1.

A limitation of either embodiment of the invention is that it may only integrate well with trailers having a relatively clear underside. Many tank trailers, and low ride moving vans will not have sufficient clearance under the trailer body to facilitate the installation of the components of the invention.

The present invention, described above, relates to a truck trailer steering apparatus. Features of the present invention are recited in the appended claims. The drawings contained herein necessarily depict structural features and embodiments of the truck trailer steering apparatus, useful in the practice of the present invention.

However, it will be appreciated by those skilled in the arts pertaining thereto, that the present invention can be practiced in various alternate forms, proportions, and configurations. Further, the previous detailed description of the preferred embodiment of the present invention are presented for purposes of clarity of understanding only, and no unnecessary limitations should be implied therefrom. Finally, all appropriate mechanical and functional equivalents to the above, which may be obvious to those skilled in the arts pertaining thereto, are considered to be encompassed within the claims of the present invention.

What is claimed is:

1. A truck trailer steering apparatus comprising a trailer body wherein said trailer body has a bottom side, a first leading end, and a second trailing end,
   a coupler plate fixedly attached to said bottom side of said trailer body at said trailing end,
   a king pin fixedly attached to said coupler plate, extending downwardly and perpendicularly from said bottom side of said trailer body,
   a converter dolly used for towing a double trailer engaged in said king pin,
   said converter dolly having a tongue with a pivot pin,
   at least one hydraulic actuator having two ends, a first end hingedly attached to said pivot pin extending essentially perpendicularly from said tongue, and a second end hingedly attached to said bottom side of said trailer body,
   a hydraulic pump and motor to drive said hydraulic actuator, and
   a control mounted in the cab of the tractor towing said trailer body whereby when the driver operates said control, said hydraulic actuator extends or retracts, causing said converter dolly to rotate about said king pin to steer said trailer body.

2. The truck trailer steering apparatus of claim 1 wherein said converter dolly used for towing a double trailer is a tandem configuration having two axles.

3. The truck trailer steering apparatus of claim 1 wherein said converter dolly used for towing a double trailer is a single configuration having one axle.

4. The truck trailer steering apparatus of claim 1, wherein said hydraulic pump and motor is a self-contained unit, and said control is an electronic device connected to said self-contained hydraulic pump and motor unit.

5. The truck trailer steering apparatus of claim 1, further comprising a proximity detection sensor mounted on said bottom side of said trailer body, a sensor sending unit mounted on said converter dolly in close proximity to said positional sensor, and a graphic indicator mounted in said cab of the towing tractor, whereby said graphic indicator displays the reading of said positional sensor relative to the location of said sensor sending unit whereby the driver of said tractor towing said trailer body may visually determine the rotational position of said converter dolly relative to said trailer body.

6. The truck trailer steering apparatus of claim 1 further comprising a locking pin removably engaged in said converter dolly, and fixedly attached to said bottom side of said trailer body whereby said converter dolly may be prevented from rotating about said king pin as a safety precaution when travelling at highway speeds.

7. A truck trailer steering apparatus comprising a trailer body wherein said trailer body has a bottom side, a first leading end, and a second trailing end, a subframe slidably attached to said bottom side of said trailer body at said trailing end, a coupler plate fixedly attached to said subframe, a king pin fixedly attached to said coupler plate, extending downwardly and perpendicularly from said bottom side of said trailer body, a converter dolly used for towing a double trailer engaged in said king pin, said converter dolly having a tongue with a pivot pin, at least one hydraulic actuator having two ends, a first end hingedly attached to said pivot pin extending essentially perpendicularly from said tongue, and a second end hingedly attached to said subframe, a hydraulic pump and motor to drive said hydraulic actuator, and a control located in the cab of the tractor towing said trailer body whereby when the driver operates said control, said hydraulic actuator extends or retracts, causing said converter dolly to rotate about said king pin to steer said trailer body.

8. The truck trailer steering apparatus of claim 7 wherein said converter dolly used for towing a double trailer is a tandem configuration having two axles.

9. The truck trailer steering apparatus of claim 7 wherein said converter dolly used for towing a double trailer is a single configuration having one axle.

* * * * *